United States Patent
Marc

(10) Patent No.: US 8,715,437 B2
(45) Date of Patent: May 6, 2014

(54) COMPOSITE FOAM PRODUCT

(75) Inventor: Michel Marc, Lenexa, KS (US)

(73) Assignee: Novation IQ LLC, Lenexa, KS (US)

( * ) Notice: Subject to any disclaimer, the term of this patent is extended or adjusted under 35 U.S.C. 154(b) by 223 days.

(21) Appl. No.: 12/710,098

(22) Filed: Feb. 22, 2010

(65) Prior Publication Data

US 2011/0206926 A1    Aug. 25, 2011

(51) Int. Cl.

| | |
|---|---|
| *B29C 44/06* | (2006.01) |
| *B29C 44/10* | (2006.01) |
| *B32B 5/18* | (2006.01) |
| *B32B 5/20* | (2006.01) |
| *B29C 44/56* | (2006.01) |
| *B29C 33/08* | (2006.01) |
| *B29C 35/12* | (2006.01) |
| *B29C 44/58* | (2006.01) |
| *B29C 65/48* | (2006.01) |
| *B32B 27/06* | (2006.01) |
| *B32B 27/08* | (2006.01) |

(52) U.S. Cl.
CPC ............. *B29C 44/5681* (2013.01); *B29C 33/08* (2013.01); *B29C 35/12* (2013.01); *B29C 44/065* (2013.01); *B29C 44/105* (2013.01); *B29C 44/586* (2013.01); *B29C 44/587* (2013.01); *B29C 65/48* (2013.01); *B32B 5/18* (2013.01); *B32B 5/20* (2013.01); *B32B 27/065* (2013.01); *B32B 27/08* (2013.01)
USPC ............ 156/78; 156/79; 156/245; 156/274.4; 156/274.8; 264/46.4; 264/55

(58) Field of Classification Search
CPC .......... B32B 5/18; B32B 5/20; B32B 27/065; B32B 27/08; B32B 2037/1207; B29C 33/06; B29C 33/08; B29C 35/12; B29C 44/065; B29C 44/08; B29C 44/105; B29C 44/5681; B29C 44/586; B29C 44/587; B29C 65/48; B29C 65/486
USPC ........ 156/79, 245, 274.4, 274.8, 78; 264/418, 264/421, 45.2, 46.5, 46.8, 313, 314, 570, 264/46.4, 55
See application file for complete search history.

(56) References Cited

U.S. PATENT DOCUMENTS

| | | | | |
|---|---|---|---|---|
| 2,394,122 | A | * | 2/1946 | Urmston ....................... 264/46.4 |
| 3,381,077 | A | * | 4/1968 | Bonner, Jr. .................... 264/321 |
| 3,640,913 | A | * | 2/1972 | Cerra .............................. 521/92 |
| 4,153,254 | A | | 5/1979 | Marc |
| 4,193,324 | A | | 3/1980 | Marc |
| 4,255,368 | A | | 3/1981 | Olabisi |
| 4,268,238 | A | | 5/1981 | Marc |
| 4,435,910 | A | | 3/1984 | Marc |
| 4,441,876 | A | | 4/1984 | Marc |
| 4,524,037 | A | | 6/1985 | Marc |
| 4,671,992 | A | * | 6/1987 | Lancaster et al. .......... 428/316.6 |
| 4,851,167 | A | | 7/1989 | Marc |
| 4,921,647 | A | | 5/1990 | Stewart |
| 5,068,983 | A | | 12/1991 | Marc |

(Continued)

FOREIGN PATENT DOCUMENTS

GB          1097009          3/1996

*Primary Examiner* — Michael Tolin
(74) *Attorney, Agent, or Firm* — Stinson Leonard Street LLP

(57) ABSTRACT

A composite foam product comprising a foam core surrounded by a gas-impermeable film. The gas-impermeable film retains the gas formed from the blowing agent so that the pressure inside the foam core is above ambient pressures.

36 Claims, 3 Drawing Sheets

(56) References Cited

U.S. PATENT DOCUMENTS

| | | |
|---|---|---|
| 5,146,698 A | 9/1992 | Tilles et al. |
| 5,147,896 A | 9/1992 | York |
| 5,157,960 A | 10/1992 | Brehm et al. |
| 5,164,137 A | 11/1992 | Omata et al. |
| 5,585,058 A | 12/1996 | Kolosowski |
| 5,706,589 A | 1/1998 | Marc |
| 6,279,738 B1 | 8/2001 | Mungo et al. |
| 6,425,195 B1 | 7/2002 | Donzis |
| 6,583,190 B2 | 6/2003 | Lee et al. |
| 6,623,674 B1 * | 9/2003 | Gehlsen et al. ............. 264/45.5 |
| 7,232,299 B2 | 6/2007 | Marc |
| 7,578,077 B2 | 8/2009 | Marc |
| 2004/0096626 A1 * | 5/2004 | Azevedo ............. 428/136 |
| 2004/0258902 A1 | 12/2004 | Seth et al. |
| 2006/0012082 A1 | 1/2006 | Marc |
| 2006/0012083 A1 | 1/2006 | Marc |
| 2006/0279014 A1 | 12/2006 | Balchin et al. |
| 2007/0257527 A1 | 11/2007 | Marc |
| 2009/0013557 A1 | 1/2009 | Rudy |
| 2009/0236030 A1 | 9/2009 | Marc |
| 2009/0241282 A1 | 10/2009 | Marc |
| 2010/0096780 A1 | 4/2010 | Marc |

* cited by examiner

COMPOSITE FOAM PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates in general to composite foam products and processes for making the composite foam products.

2. Description of Related Art

Foams range in consistency from rigid materials suitable for structural use to flexible substances for soft cushions and packaging materials. These foams range in cellular formation from open or interconnecting-cell foams to closed or unicell foams. The cell structure may range from large to fine. Electrical, thermal, mechanical, and chemical properties can be varied within wide limits depending on the thermoplastic resin composition and the method chosen to create the foam.

Foam products can be produced by a wide variety of processes. In some methods, a gaseous "blowing agent" is added to the foamable material during processing. Other methods involve producing a gaseous blowing agent in the foamable material during processing. Blowing agents generally work by expanding a thermoplastic resin to produce a cellular structure having far less density than the resin from which the foam is made. Bubbles of gas form around "nucleation sites" and are expanded by heat or reduced pressure or by a process of chemical reaction in which a gas is evolved. Additives may be incorporated into the resin to promote nucleation for a particular blowing agent and, consequently, a more uniform cell distribution.

The gas from the blowing agent used to form the cellular structure of the foam may initially reside in the cells of most closed cell foams at an increased pressure. As the foam is exposed to the environment, however, the gaseous blowing agent permeates out of the foam cell structure while the component gases of the ambient air permeate into the foam cell structure. That is, there is an influx of nitrogen and oxygen from the surrounding air into the foam, and there is also an efflux of the blowing agent from the foam. The rate of the influx/efflux varies on parameters such as the molecular size and polarity of the gaseous blowing agent(s), the type of polymers(s) comprising the foam, the cell size, the cell structure, the pressure and temperature, and the ambient conditions. Nonetheless, the final result is that the pressure inside of the gases inside the foam cells ultimately comes into equilibrium with the ambient pressure. This is true for even closed cell foams since the gas molecules are able to permeate and move through the polymer molecules comprising the foam.

BRIEF SUMMARY OF THE INVENTION

The present invention is directed to an improved composite foam product comprising a foam core having a plurality of cells. A gas impermeable film completely surrounds the exterior surface of the foam core and is adhered to the exterior surface. The gas impermeable film is applied to the exterior surface of the foam core during the foaming process or shortly thereafter so that the blowing agent gas is retained within the gas impermeable film and in the plurality of cells. The pressure inside the composite foam product thus exceeds the ambient pressure. No pumps, valves, or other devices are needed to provide the desired elevated pressures inside the composite foam product.

In another aspect, the present invention is directed to a composite foam product "consisting essentially of" the foam core surrounded by the gas impermeable film. Thus, the invention consists essentially of the foam core having the plurality of cells in the closed cell structure and the gas impermeable film intimately adhered to the entire exterior surface of the foam core so that the blowing agent gas is retained within the gas impermeable film. The pressure in the plurality of cells is maintained at a pressure exceeding the ambient pressure. Other components may be present in the foam core, such as elastomeric components, crosslinking agents, heat stabilizers, light stabilizers, fillers, nucleating agents, antioxidants, colorants, and pigments. However, such components are not necessary to maintain the pressure in the foam core above ambient pressure since the gas-impermeable film provides this function. Moreover, the term "consisting essentially of" excludes other methods of pressurizing the foam core, such as pumps, valves, or other mechanical devices.

In still another aspect, the present invention is directed to a process for forming the composite foam products described herein. In general, the process comprises the steps of forming a foam core from a foamable material and a blowing agent. The foam core has a plurality of cells therein such that the plurality of cells retain gas from the blowing agent therein at a pressure above an ambient pressure. The process also comprises the step of adhering a gas impermeable film to the exterior surface of the foam core. The adhering step is performed simultaneously with the forming step or shortly thereafter so as to retain the gas from the blowing agent in the cells at the pressure above the ambient pressure. Adhesive may optionally, be used in order to better adhere the foam core and the gas impermeable film.

In one aspect, the foam core is prepared by inserting a foamable material and said blowing agent into a mold and then applying an alternating radio frequency dielectric field across the mold to heat said foamable material. For example, the foam core may be prepared by using an alternating radio frequency dielectric field generated between a first top electrode and a second bottom electrode. In one aspect, the gas impermeable film is applied after formation of the foam core. In another aspect, the step of forming the foam core and the adhering the gas impermeable film to the exterior surface of the foam core are performed nearly simultaneously. Thus, in one aspect, the process comprises the steps of inserting the foamable material and the blowing agent into a mold, surrounding the foamable mixture and blowing agent with the gas impermeable film, and applying an alternating radio frequency dielectric field across the mold to heat the foamable material and form the foam core. The frequency of the alternating radio frequency dielectric field is preferably about 1 MHz to 100 MHz, and the voltage of the alternating radio frequency dielectric field is preferably about 1000 to 10,000 V.

In one aspect, the process comprises the steps of positioning the gas impermeable film on a bottom mold of a molding cavity of a flow molding apparatus having an upper mold and the bottom mold; placing the foaming mixture on the gas impermeable film in the molding cavity; placing additional gas impermeable film over the foaming mixture in the cavity so that the gas impermeable film surrounds the foaming mixture; and heating said foaming mixture to form said foam core. The flow molding apparatus may have a movable diaphragm separating the foaming mixture and said gas impermeable film from a displaceable liquid movable through one or more ports. Heating causes the foaming mixture to expand and thus causes the movable diaphragm to move and displace liquid through said one or more ports.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 3A illustrates the gas-impermeable film surrounding the foaming mixture prior to the application of any heat to form the foam core. FIG. 3B illustrates the formation of the foam core having the gas-impermeable film thermally bonded thereto after the application of heat.

FIG. 4B is a cross section taken through line 4b shown in FIG. 4A.

DETAILED DESCRIPTION OF PREFERRED EMBODIMENT

Figure 1A:
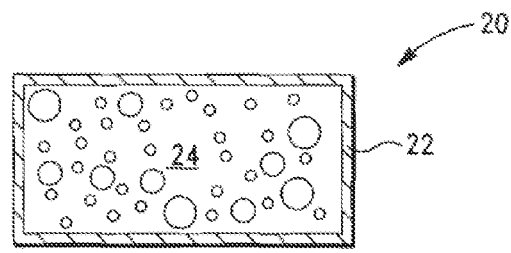
FIG. 1A is a cross-section of the composite foam product of the present invention. illustrating a foam core surrounded by a gas impermeable film. The composite foam product is shown after die-cutting excess gas impermeable film.

Turing now to FIG. 1A, the present invention is directed to an improved composite foam product 20 comprising a foam core 24 having a plurality of cells. The exterior surface of the foam core 24 is surrounded by a gas impermeable film 22. The gas impermeable film is applied during foaming process or shortly thereafter so that the blowing agent gas is retained within the gas impermeable film and in the plurality of cells. Because the blowing agent gas cannot escape through the gas impermeable film, the pressure inside the foam core of the composite product exceeds the ambient pressure. Typically, the pressure inside the composite foam product is about 1.1, 1.2, 1.3, 1.4, 1.5, 1.6, 1.7, 1.8, 1.9, or 2.0 times the ambient pressure (or some range therebetween). Thus, in one aspect, the pressure in the foam core is about 1.1, 1.2, 1.3, 1.4, 1.5, 1.6, 1.7, 1.8, 1.9, or 2.0 atm. Typically, the pressure is about 1.2 to 1.5 atm, but the internal pressure will vary depending on the density of the foam core. Further, the elevated pressures are maintained for long periods of time, typically months and even years. No pumps, valves, or other devices are needed to provide the desired elevated pressures inside the composite foam product.

The composite foam product 20 exhibits improved rebound properties compared to foam cores without the gas impermeable film. In one aspect, the rebound of the composite foam product is at least about 10% higher than the corresponding foam product without the gas impermeable film as measured by ASTM D7121-05. In another aspect, the rebound of the composite foam product is about 10%, 15%, 20%, 25%, 30%, 35%, 40%, 45%, or 50% (or some range therebetween) higher than the corresponding conventional foam product having no gas impermeable film.

The composite product 20 exhibits improved compression set properties compared to foam cores without the gas impermeable film. In one aspect, the compression set of the composite foam product is at least about 50% lower than the corresponding foam product without the gas impermeable film. In another aspect, the compression set of the composite foam product is about 50%, 45%, 40%, 35%, 30%, 25%, 20%, 15%, 10%, or 5% (or some range therebetween) lower than the corresponding conventional foam product.

It will be appreciated that physical properties of the gas impermeable film may alter the physical properties of the composite foam product. For example, tensile strength, abrasion, and tear strength will all be affected by having the gas impermeable film surround the foam core.

The present invention is also directed to methods of making the composite foam product. In general, the gas impermeable film is applied in situ during foaming process or shortly thereafter so that the blowing agent gas is retained within the gas impermeable film and in the plurality of cells. Typically, once the foam core is prepared using conventional techniques, the gas impermeable film is applied within about 120 minutes, preferably within 60 minutes, and more preferably within 30 minutes. It is preferable that the delay from foam formation to formation of the gas impermeable film be as short as possible. Thus, in another aspect, the gas impermeable film is applied within 1, 2, 3, 4, or 5 minutes after the foam core is formed. It will be appreciated that the time delay (if any) between formation of the foam core and the application of the gas impermeable film to achieve a desired internal target pressure within the foam core may depend upon a number of factors, such as the molecular size and/or polarity of the gaseous blowing agent(s), the type of polymers(s) comprising the foam, the foam cell size, the foam cell structure, the pressure of the cells during formation of the foam core, the temperature of the foam core, and the ambient conditions.

The foam core 24 may be made from any suitable foaming mixture as is known to those skilled in the art. The foaming mixture preferably comprises one or more foamable materials and one or more blowing agents.

The foamable material generally comprises known thermoplastic or thermoset materials and mixtures thereof. Examples include polyethylene resins, polypropylene resins, and other thermoplastic resins. Examples of the suitable polyethylene resins are high density polyethylene, low density polyethylene ("LDPE"), linear low density polyethylene, ethylene-vinyl acetate ("EVA") copolymer, ethylene-methacrylic acid copolymer, ethylene-acrylic ester-maleic anhydride terpolymer, ethylene-glycidyl methacrylate copolymer, ethylene-glycidyl methacrylate-methacrylateterpolymer, ethylene-glycidyl methacrylate-vinyl acetate terpolymer, ethylene-alpha-olefin copolymer, modified polyolefin, chlorinated polyethylene, and other thermoplastic synthetic resins mainly composed of ethylene. Examples of suitable polypropylene resins are propylene homopolymer, propylene-ethylene random copolymer, propylene-ethylene block copolymer, propylene-butene random copolymer, propyleneethylene-butene terpolymer, etc. Examples of suitable thermoplastic synthetic resins are polyvinyl chloride ("PVC"), polyvinyl chloride-vinyl acetate copolymer, chlorinated polyvinyl chloride, polyvinyl chloride-ethylene-vinyl acetate copolymer, polyvinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, and other vinyl based resin powders. The preferred foamable materials include PE-EVA foam, PVC foam, vinyl nitrile foam, PVC-nitrile rubber foam, and neoprene foam. Of course, other foamable materials known to those skilled in the art may also be used in accordance with the present invention. Further, it is anticipated that the present invention will be applicable to newly developed foaming technologies and foaming materials.

Blowing agents include compressed gases that expand when pressure is released, soluble solids that leave cells when leached out, liquids that develop cells when they change to gases, and solid chemical agents that decompose or react under the influence of heat to form a gas. Any suitable blowing agent may be used in the foamable mixture. Exemplary blowing agents include halocarbons such as fluorocarbons and chlorofluorocarbons; hydrohalocarbons such as hydrofluorocarbons and hydrochlorofluorocarbons; alkylhalides, such as methyl chloride and ethyl chloride; and hydrocarbons. Exemplary fluorocarbon blowing agents include 1,1,-difluoroethane (HFC-152a); 1,2-difluoroethane (HFC-152); 1,1,1,2-tetrafluoroethane (HFC-134a); 1,1,2,2-tetrafluoroethane (HFC-134); 1,1,1-trifluoroethane (HFC-143a) and 1,1, 2-trifluoroethane (HFC-143); pentafluoroethane (HFC-125). Exemplary hydrocarbons include alkanes or alkenes having from 1 to 9 carbon atoms. Exemplary alkanes include propane, n-butane, isobutane, pentane, isopentane, hexane, isohexane, heptane, and the like. Other suitable blowing agents also include chemical blowing agents such as N-nitroso compounds, sulfonyl hydrazines, sulfonyl semicarbazides, ammonium, and azo type compounds. Such compounds include dinitroso pentamethylene tetraamine, N,N'-dinitroso-N—N'-dimethylterephthalimide, 4,4'-oxybis (benzenesulfonyl hydrazide), p-toluene sulfonyl semicarbazide, p,p'-oxybis (benzene sulfonyl semicarbazide), the barium salt of azodicarboxylic acid, diisopropyl azodicarboxylate, ammonium carbonate, ammonium bicarbonate, potassium bicarbonate, diazoaminobenzene, diazoaminotoluene, azodicarbonamide, diazoisobutyronitrile, and the like. In a preferred aspect, the blowing agent comprises one or more pristine or inert blowing agents such as air, carbon dioxide, nitrogen, argon, xenon, krypton, helium, water, and agents that form such compounds. Nitrogen and carbon dioxide, in particular, have the advantage of being inexpensive, readily available, and of not being flammable, and are not considered to be harmful to the earth's ozone layer. The preferred chemical blowing agents generally are low molecular weight organic compounds that decompose at a particular temperature and release inert gases such as nitrogen, carbon dioxide, or carbon monoxide. One preferred inert blowing agent is azodicarbonamide AZ130. In one aspect, the gaseous composition produced by the blowing agent is 42% $N_2$, 21% $CO_2$, 21% $NH_3$, and 16% CO.

It will also be appreciated that the blowing agent may comprise a mixture of two or more of any of the above blowing agents. See. e.g., Lee et al., U.S. Pat. No. 6,583,190; Lee et al., U.S. Pat. No. 5,348,984; Lee et al., U.S. Pat. No. 5,462,974; and Ealding, U.S. Pat. No. 3,939,238. When multiple blowing agents are used, the blowing agents may decompose and release the blowing agent gas at the same or different temperatures.

The amount of blowing agent incorporated into foaming mixture is from about 0.2 to about 30, preferably from about 0.5 to about 10, and most preferably from about 1.5 to 8 parts per hundred resin ("phr"). Thus, in one aspect the blowing agent may comprise 1, 2, 3, 4, 5, 6, 7, 8, 9, 10, 11, 12, 13, 14, 15, 16, 17, 18, 19, 20, 20, 22, 23, 24, 25, 26, 27, 28, 29, or 30 phr of the foaming mixture or some range therebetween. The amount of blowing agent used will depend upon the composition of the foaming material and the density of the foam core. For example, for an EVA/LDPE foam core having a density of about 2 lbs/ft$^3$, use of 18 phr azodicarbonamide is typically used. An EVA/LDPE foam core having a density of 1.5 lbs/ft$^3$ typically uses about 25 phr azodicarbonamide.

The foaming mixture may optionally contain elastomeric components such as polyisobutylene, polybutadiene, ethylene/propylene copolymers, and ethylene/propylene diene interpolymers if desired. Other possible additional components include one or more crosslinking agents, heat stabilizers, light stabilizers, fillers, nucleating agents, antioxidants, colorants, and pigments, and lubricants. For example, crosslinking agents include the peroxides, for example, dicumyl peroxide, dibenzoyl peroxide, t-butyl perbenzoate 2,5-bis (ter-butylperoxy)-2,5-dimethylhexane and 2,5-dimethyl-2,5-di(t-butylperoxy). Inert nucleating agents which can be useful include magnesium oxide, calcium oxide, zinc oxide, lead oxide, barium oxide, and talc. Suitable lubricants include for example but not limited to various hydrocarbons such as paraffin; paraffin oils; low molecular weight polyethylene; oxidized polyethylene; amide waxes, metal salts of fatty acids; esters of fatty acids such as butyl stearate; fatty alcohols, such as cetyl, stearyl or octadecyl alcohol; metal soaps such as calcium or zinc salts of oleic acid; fatty amides of organic acids; polyol esters such as glycerol monostearate, hexaglycerol distearate and mixtures thereof. Examples of possible fatty acids to be used include but are not limited to stearic acid and calcium stearate.

Further, it will be appreciated it is possible to reinforce the foam core by including filaments or fibers or fabrics in it. Typical reinforcements can be inorganic materials such as fiberglass or carbon fiber; natural organic fibers such as silk, cotton, wool or the like, or synthetic organic fibers such as urethane fibers, nylon filaments, nylon fabrics, aramid filaments and fabrics, and the like. This reinforcement can be laminated into the foam core (either above or below the gas-impermeable film) or incorporated into the foaming mixture.

The foam core preferably has a closed-cell structure. In general, the closed cell foams do not have interconnected cells/pores. Typical densities for the foam core range from between about 0.5 to about 25 pounds per cubic foot. Preferred foam densities are from about 2 to 12 pounds per cubic foot. Typically, the density of the foam core is about 2, 3, 4, 5, 6, 7, 8, 9, 10, 11, or 12 pounds per cubic foot, or some range therebetween.

In the present invention, an impermeable film surrounds the exterior surface of the foam core. In one aspect, the gas impermeable film comprises a material selected from the group consisting of polyolefins, polyurethanes, polyvinyls, polyethers, and polyesters. Exemplary gas impermeable films include those made from polymethylpentene homopolymer or copolymer, polyethylene homopolymer or copolymer, polypropylene homopolymer or copolymer, polyether-block-amide copolymer, polyether-polyester copolymer, copolyester, and polyvinyl chloride. In another aspect, the gas impermeable film comprises polyethylene/vinyl alcohol copolymers ("EVOH"), SARAN, poly(vinylidine chloride) copolymer ("PVDC"), polyethylene terephthalate ("PET"), polyamides ("PA"), nylon, or thermoplastic polyurethane ("TPU"). The gas impermeable may comprise one or more layers of materials. Further the layers may be applied in different directions.

The gas impermeable film may have any suitable thickness. Typically, the film is about 1 to 200 mils in thickness with thicknesses in the range of from about 2 to 100 mils being preferred and excellent results being attained with thicknesses of from about 10 to about 50 mils. Typically, films having a thickness of about 10, 20, 30, 40, 50, 60, 70, 80, 90, or 100 mils or some range therebetween are used. The thickness may be uniform or non-uniform.

In the present invention the foam core is intimately adhered (glued, bonded, welded, or the like) on substantially all of its external surfaces to the internal surface of the gas impermeable film. That is, the foam core presses out against the wall and the wall pushes in against the cote. There is no gas between the gas-impermeable film and the foam core, which would cause undesirable ballooning such areas. The intimate adherent contact between the foam core and the outer wall gives rise to an unexpected degree of product integrity and unexpectedly superior impact absorbing capabilities.

One or more adhesives may optionally be used to adhere the gas impermeable film to the exterior surface of the foam core. This adhesive is most conveniently an activated adhesive such as a light activated adhesive, UV activated adhesive, or heat activated adhesive so as to permit the foam core to be adhered to the gas impermeable film together and then bonded shortly after formation of the foam core. A typical heat-activated adhesive is the Royal Adhesive DC5 11324 material sold by Uniroyal. This adhesive is a two part poly(urethane)/isocyanate adhesive which has the added advantage of being water-based. This material heat-activates at 300-325 F to form a tough adherent bond. Other useful adhesives can include epoxy adhesives, contact cement type poly (urethane) adhesives such as the Uniroyal "Silaprenes," the 3M "Scothgrip" adhesives, and the isoprene contact cements. Other suitable adhesives include combinations of EVA adhesive films and PU adhesive films. For example, the two adhesive films can be co-extruded together and adhered to the gas impermeable film. Alternatively, the gas-impermeable film and two adhesive films may together be co-extruded. The three films may then be used and adhere the gas impermeable film to the foam core.

In the present invention, the gas impermeable film is applied during the foaming process or shortly thereafter so that blowing agent gas is retained within the gas impermeable film and in the plurality of cells. Because the blowing agent gas cannot escape through the gas impermeable film, the pressure inside the composite foam product exceeds the ambient pressure. The composite product exhibits improved rebound and compression properties compared to foam cores without the gas impermeable film. Preparation of the composite product shall now be described in the following exemplary embodiments.

First Exemplary Embodiment

In a first exemplary embodiment, a foam core is made using conventional techniques, e.g., using injection molding, convection oven molding, microwave molding, radio frequency molding, or any other foam molding technique know to those skilled in the art. Shortly after formation of the foam core, the gas impermeable film is adhered to the exterior surface in order to retain the gas from the blowing agent in the foam core.

In a preferred aspect, the foam core is made from a molding apparatus that heats the molding cavity using an alternating radio frequency dielectric field. For example, in one aspect, the flow molding apparatus may comprise a top electrode and a bottom electrode with a mold disposed therebetween. A foamable material and blowing agent is placed in a cavity of the mold and then compressed during the heating cycle. After the heat is terminated, the compressed foamable material is permitted to expand as it cools so as to conform to the shape of the mold and thereby form the foamed core. Examples of this type of a molding apparatus are disclosed in Marc, U.S. Pat. No. 4,441,876, Marc, U.S. Pat. No. 4,524,037, and Marc, U.S. Published Patent No. 2006/0012082, which are incorporated by reference. A hardened skin may form on the exterior surface of the foam core in accordance with Marc, U.S. Published Patent No. 2006/0012082. This hardened skin decreases the rate at which the blowing agent gas escapes from the cells in the closed cell foam core since that portion of the foam core is generally less impermeable to gas than the inner portion of the foam core.

After the foam core has been formed, the gas impermeable film is then adhered to the exterior of foam core. Typically, the foam core is allowed to cool in order to stabilize the size and shape of the foam core, with temperatures of about ambient to about 100° C. being attained. It is also preferable that the exterior surface of the foam core remain at a substantially constant temperature so that the bonding of the gas impermeable film to the foam core occurs at generally the same rate. Importantly, the gas impermeable film is applied to the foam core shortly after its formation so that the pressure in the foam core is higher than the ambient pressure. Typically, this occurs within 1 to 20 minutes after the foam core is formed, but the extent to which adherence of the gas impermeable film may be delayed depends upon such factors as the foam core thickness and density.

Figure 2:
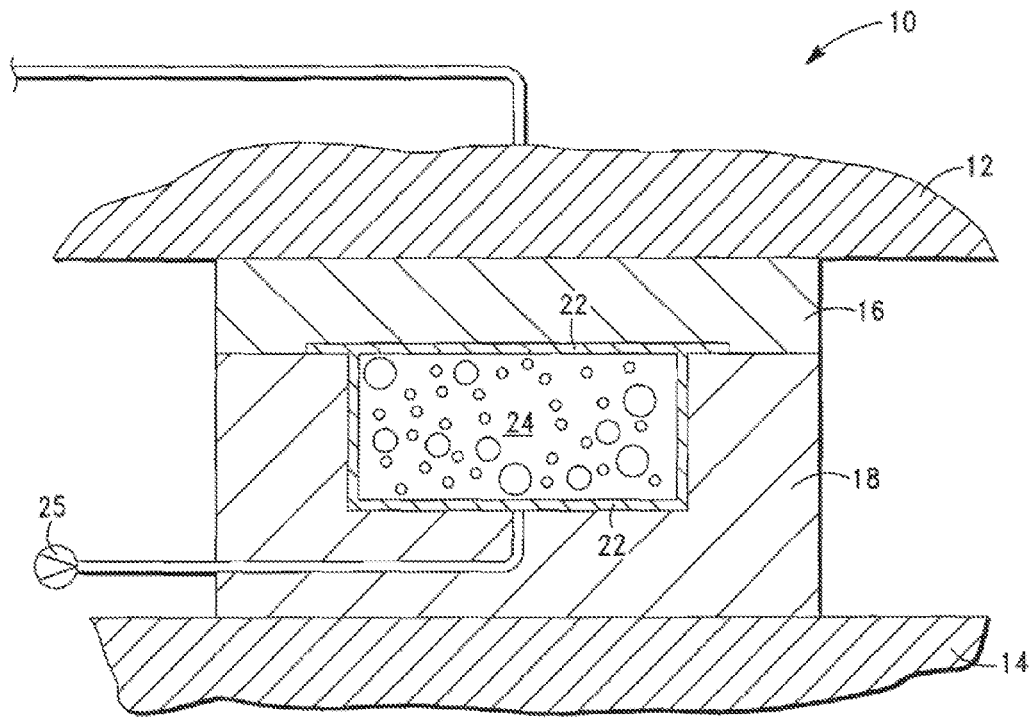
FIG. 2 is a cross-sectional view of an exemplary apparatus for adhering the gas-impermeable film to the foam core shortly after formation of the foam core.

Most preferably, the gas impermeable film is bonded to the foam core using an apparatus for applying an alternating radio frequency electric field. An exemplary device is illustrated in FIG. 2. More specifically, apparatus 10 includes a top electrode 12 and a bottom electrode 14, both of which are connected to an electromagnetic energy source or generator (not shown) operable to generate a dielectric field between the electrodes. The generator may contain a power tube and LC circuit, or may alternatively contain solid-state technology. Preferably, the generator is tuned to resonate at the desired frequency, which occurs when the total capacitance including the load (i.e., the foam core, the gas impermeable film, and the mold) is equal to the total inductance. For example, the top electrode 12 may be the high voltage electrode while the bottom electrode 14 is a ground electrode (or vice versa). The dielectric field may be generated at frequencies ranging from about 1 MHz to 100 MHz, and is preferably generated from about 25 MHz to 40 MHz. Most preferably, the dielectric field is generated at either 27.12 MHz or 40.68 MHz (both of which are allowed center frequencies for industrial, scientific, and medical (ISM) applications). Also included within apparatus 10 are a top mold 16 and a bottom mold 18 that together define a molding cavity therebetween. The cavity is shaped to conform to the shape of the foam core. The mold is typically make of a silicon rubber V-1008 (manufactured by Rhodia Inc.).

In general, the gas impermeable film 22 (and optional adhesive film(s)) is preheated and then placed on the bottom mold 18. The molding cavity is closed, and a vacuum is applied in order to preform the gas impermeable film 22 (and optional adhesive film(s)) to the shape of the mold. The molding cavity is opened, and then the already-formed foam core 24 is placed between the top mold and the bottom mold and two electrodes. Another gas impermeable film 22 (and optional adhesive film(s)) is placed on top of the foam core 24 between the foam core and the top mold 16. Typically, excess gas impermeable film (and/or optional adhesive film(s)) extends beyond the molding cavity to help ensure complete coverage of the external surface of the foam core 24 as generally shown in FIG. 2. The key aspect is that the gas impermeable film surrounds the entire exterior surface of the foam core 24. An alternating radio frequency dielectric field generated between the electrodes heats the gas impermeable film 22, thereby thermally bonding the film to the foam core 24.

Controlled heating throughout the foam core and/or gas impermeable film (if needed) may be obtained as generally set forth in Marc, U.S. Pat. No. 4,441,876, which is incorporated herein by reference. In general, to obtain uniform heating, a constant capacitance is maintained throughout all of the different thickness sections of the gas impermeable film. This may be accomplished by equalizing the relative dielectric constants between the gas impermeable film and the mold, preferably by altering the relative dielectric constant of the mold via the use of additives. Alternatively, the capacitance may be equalized by modifying the spacing between the top and bottom electrodes in the different thickness sections of the gas impermeable film.

It will be appreciated that in most instances, the melting/softening temperature of the gas impermeable film (and optional adhesive film(s)) will be less than the temperature at which the already formed foam core begins to degrade. Thus, in general, the gas impermeable film may be adhered to the foam core without the use of any additives. If the gas impermeable film and the foam core are made of similar materials, however, they will likely have similar dielectric constants and power factors and thus heat at similar rates. Additives may be placed in the foaming mixture (and resulting foam core) in order to alter the heating rates as desired as generally disclosed in Marc, U.S. Publication No. 2006/0012083, which is incorporated herein by reference. The heating necessary may also depend on whether adhesive issued to adhere the gas impermeable film to the foam core. Typically, when an adhesive is used to adhere the gas impermeable film to the foam core, the temperature of reaches about 80 to 120° C. during the heating step. However, when no adhesive is used to adhere the gas impermeable film to the foam core, the temperature during heating typically reaches about 150 to 190° C.

Figure 1B:
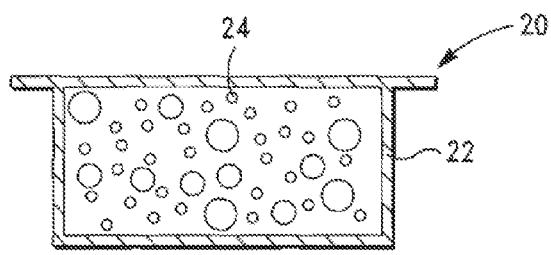
FIG. 1B is a cross-section of the composite foam product of the present invention, illustrating a foam core surrounded by a gas impermeable film. The composite foam product is shown prior to die-cutting excess gas impermeable film.

The resulting composite foam product 20 after being removed from the apparatus 10 is illustrated in FIG. 1B. Excess gas impermeable film 22 may be removed from the composite product as generally shown in FIG. 1A. Typically, the composite foam product is die-cut in order to remove the excess film 22. Other removal methods may be used, for example, manual cutting, tearing, and the like.

In the composite foam product 20, the gas impermeable film 22 surrounds the entire exterior surface of the foam core 24 and is adhered to the exterior surface, thereby retaining gas from the blowing agent in the plurality of cells of the foam core. Because the blowing agent gas cannot escape through the gas impermeable film, the pressure inside the composite foam product 20 exceeds the ambient pressure. It is important that no air is trapped between the gas impermeable film and the exterior surface of the foam core so that the film is intimately contacted to the exterior surface. The intimate adherent contact between the foam core and the gas impermeable film gives rise to an unexpected degree of product integrity and unexpectedly superior impact absorbing capabilities.

As an example, a foam core was made comprising foaming mixture having 35% ethyl vinyl acetate, 39% ethylene-octene copolymer, and 26% ethylene-propylene-diene rubber ("EPDM") with ethylidene norborene as the diene as the resin mixture. The foaming mixture also comprised 2.6 phr zinc oxide, 0.7 phr stearic acid, 0.9 phr polyethylene glycol, 8.8 phr azodicarbonamide, 3.5 phr titanium pure, 1.0 phr dicumyl peroxide, and 13 phr fumed silica. The foam core was prepared using RF using known procedures. About 0.5 hours after formation of the foam core, a thermoplastic polyurethane film was adhered to the exterior surface of the foam core, thereby retaining blowing agent gas inside the foam core at a pressure exceeding the ambient pressure. More specifically, a molding apparatus having the general configuration shown in FIG. 2 was used. The gas impermeable film was adhered to the foam core using two adhesive films: Polyurethane 3281 (Bemis Associates, Inc., Shirley, Mass.) and EVA 449 (Worthen Industries, Nashua, N.H.). The gas impermeable film and adhesive films were about 0.5 mm thick, and were first vacuumed in the bottom mold for a few seconds in order to get the gas impermeable film to conform to the shape of the mold. The foam core was placed in the mold, and another layer of gas impermeable film and adhesive films was placed on top of the foam core. Then RF was applied for about 40 seconds at 27.12 MHz. For comparison, a foam core in which no gas impermeable film was applied was prepared.

Results

The rebound of the foam products as measured using ASTM D7121-05. A ball was dropped 23.5 inches, and the rebound was measured. The rebound of the foam having no gas impermeable film was 55% one day after formation, and 47% about one year later. The rebound of the composite foam product of the present invention having the gas impermeable film was 68% one day after formation, and 62% about one year later. The density of the foam core was about 8.5 pounds per cubic foot.

The compression of the foam was also measured by measuring the degree of compression after the foam was compressed to half of its thickness for six hours at 50° C. The compression of the EVA foam having no gas impermeable film was 30%. The compression of the composite foam product having the gas impermeable film surrounding the foam core was under 5%.

Second Exemplary Embodiment

Figure 3A:
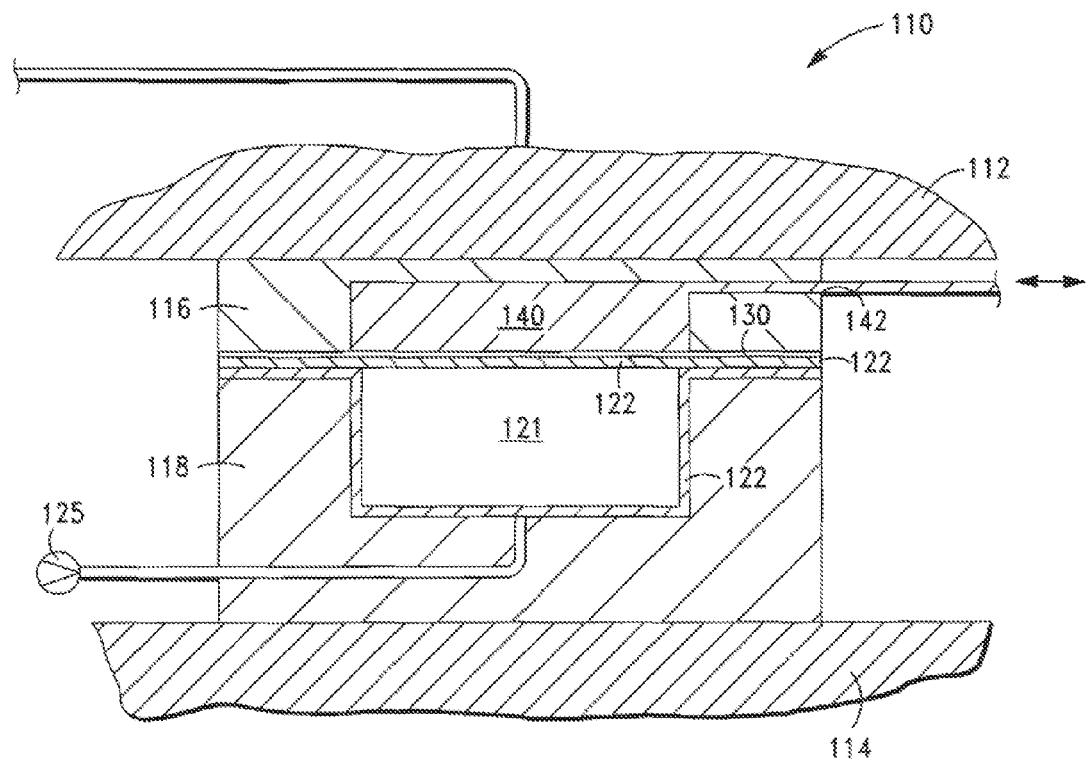
FIG. 3A and FIG. 3B are a cross-sectional view of an exemplary flow molding apparatus for adhering the gas-impermeable film to the foam core in situ during formation of the foam core.
Figure 3B:
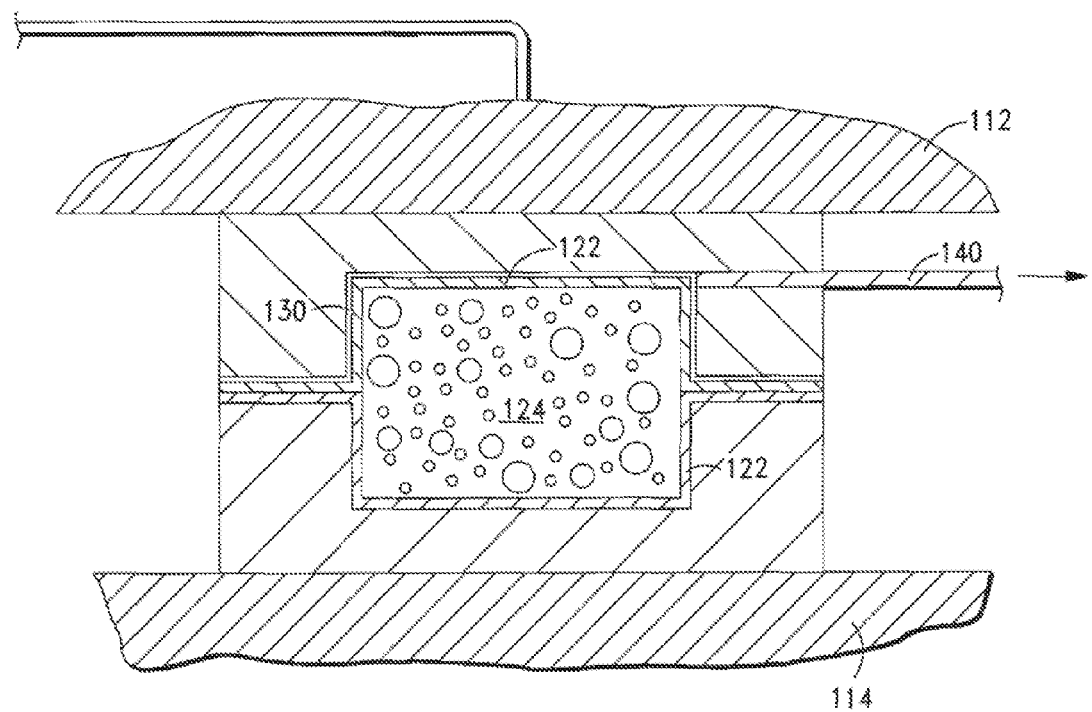

In a second exemplary embodiment, as generally shown in FIGS. 3A and 3B, formation of the foam core 124 and the adherence of the gas impermeable film 122 (and optional adhesive film(s)) are both performed in situ, and most preferably in a single continuous step. In general, a single molding apparatus is employed to both form the foam core and adhere the gas-impermeable film to the foam core. The gas impermeable film surrounding a foaming mixture is provided in the molding cavity of the molding apparatus. As the foaming mixture reaches its foaming temperature, the gas from the blowing agent causes the foamable material to expand into the foam core having the shape of the molding apparatus lined with a gas impermeable film. At the same time, the foam core is thermally bonded to the gas impermeable film.

The preferred flow molding apparatus for making the composite foam product comprises a top electrode and a bottom electrode with a two-piece mold disposed therebetween. The mold supports a diaphragm such that the gas impermeable film and foaming mixture (comprising the foamable material and blowing agent) may be placed between the diaphragm and the bottom mold. A liquid is injected into the mold above the diaphragm so as to initially deflect the diaphragm and thus expel substantially all of the air from the mold. The liquid is then extracted from the mold during the heating cycle as the foaming mixture expands to push the liquid out. Examples of this type of an apparatus are disclosed in Marc, U.S. Pat. No. 4,851,167 and U.S. Pat. No. 4,268,238, which are incorporated herein by reference. Exemplary liquids include electrically conductive liquids (such as mercury and the like) or dielectric liquids.

An exemplary device is illustrated in FIGS. 3A-3B. More specifically, apparatus 110 includes a top electrode 112 and a bottom electrode 114, both of which are connected to an electromagnetic energy source or generator (not shown) operable to generate a dielectric held between the electrodes. For example, the top electrode 112 may be the high voltage electrode while the bottom electrode 114 is a ground electrode (or vice versa). The dielectric field may be generated at frequencies ranging from about 1 MHz to 100 MHz, and is preferably generated from about 25 MHz to 40 MHz. Most preferably, the dielectric field is generated at either 27.12 MHz or 40.68 MHz (both of which are allowed center frequencies for industrial, scientific. and medical (ISM) applications). Also included within apparatus 110 are a top mold 116 and a bottom mold 118 that together define a molding cavity therebetween. The mold is typically made of a silicon rubber, which is preferably reinforced with a rigid non-metallic frame. The apparatus also includes a movable diaphragm 130 disposed in the molding cavity for separating the foaming mixture 121 and gas impermeable film 122 from a displaceable liquid 140 that is movable through one or more ports 142.

In general, as shown in FIG. 3A, the gas impermeable film 122 (and optional adhesive film(s)) is preheated and then placed on the bottom mold 118. The molding cavity is closed, and a vacuum is applied in order to preform the gas impermeable film 122 (and optional adhesive film(s)) to the shape of the mold. The molding cavity is opened, and the foaming mixture 121 comprising the foamable material and the blowing agent is placed between the top mold and a bottom mold and two electrodes such that the foaming mixture effectively becomes the dielectric of a capacitor. Another gas impermeable film 22 (and optional adhesive film(s)) is placed above the foaming mixture 121 between the foaming mixture 121 and the top mold 116. Typically, excess gas impermeable film 122 (and/or optional adhesive film(s)) extends beyond the molding cavity to help ensure complete coverage of the external surface composite product as generally shown in FIG. 3A. The key aspect is that the gas impermeable film surrounds the entire exterior surface of the foam core 24 once the composite product is formed. Another gas impermeable film 122 is placed above the foaming mixture. The foaming mixture, film, and mold effectively become the dielectric of a capacitor. An alternating radio frequency dielectric field generated between the electrodes heats the foaming mixture 121, causing the gas formed from the blowing agent to expand and produce the foam core. The movable diaphragm 130 is deflected upwards so that it displaces the displaceable liquid 140 from the molding cavity through the ports 142. As the foaming mixture 121 is heated and expands to form the foam core 124 (FIG. 3B) to meet the gas impermeable film 122, the film 122 is thermally bonded to the foam core 124 using the alternating radio frequency dielectric field. After trimming of excess gas-impermeable film around the exterior of the foam core, the composite foam product 20 is thus formed.

During formation of the foam core, the temperature of the foaming mixture typically increases to about 150 to 200° C., but the exact temperature needed to produce the foam core depends on the components of the particular foaming mixture. Uniform heating throughout foaming mixture and the gas impermeable film may be obtained as generally set forth in Marc, U.S. Pat. No. 4,441,876, which is incorporated herein by reference. The temperature of the film gas impermeable film typically reaches about 150 to 190° C. Typically, the temperature at which the gas impermeable film softens is less than the foaming temperature of the foaming mixture.

It will be appreciated that the present invention is not limited to composite foam products having a single type of foam core material surrounded by the gas impermeable film. That is, the foam core may comprise two or more different foamable materials (either in layers or mixed together) having different foaming/molding temperatures and a single heating or molding cycle. The foam core may be formed using the apparatus disclosed in Marc, U.S. Publication No. 2006/0012083, which is incorporated herein by reference.

The composite foam product of the present invention may have any suitable size and shape, depending upon the desired application and use. In general, the composite foam products of the present invention can be shaped to find application wherever high efficiency impact absorption is called for, such as in athletic wear (especially heel or foot sole pads in shoes, shoulder pads, thigh pads, hip pads, helmets), gymnastic mats, in seating systems, in vehicle interior padding materials, and the like.

Figures 4A, 4B:
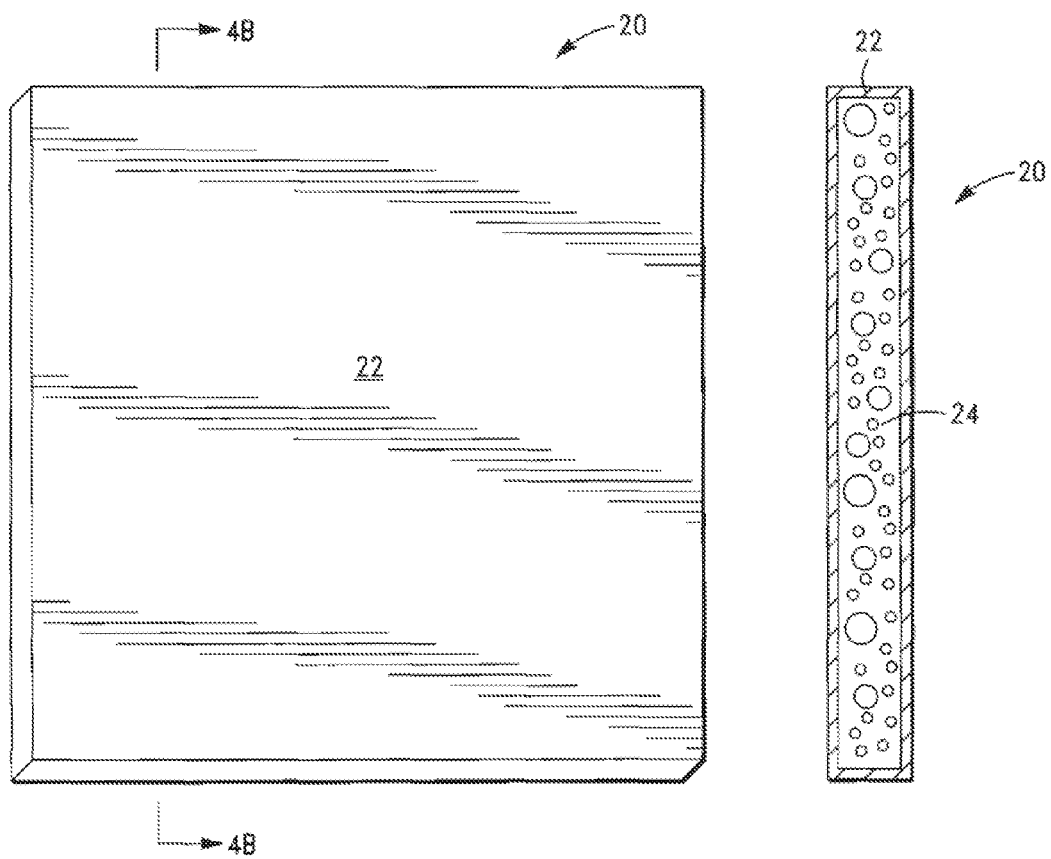
FIGS. 4A and 4B illustrate a gymnastics mat which comprises the composite foam product of the present invention.

The advantages of the composite foam product may generally be described with respect to their use as a gymnastics mat as generally illustrated in FIGS. 4A and 4B. The gymnastic mat comprises a large 12 m×12 m composite foam product 20 having the gas impermeable film 22 surrounding the foam core 24. The pressure inside the cells comprising the foam core is above ambient pressures. As a result, the mat has improved rebound and compression set properties compared to conventional mats.

The advantages of the composite foam product also may generally be described with respect to their use as heel pad in a shoe. When a conventional heel pad is used, the downward pressure of the heel causes the center of the pad to be severely depressed such that the edges of the heel pad balloon upward. When an air bladder is used, the gas rapidly moves hack and forth within the bladder when receiving compressive forces. This may be uncomfortable for the wearer. When a heel pad comprising a foam core surrounded by a gas impermeable film is used, the center of the pad depresses minimally and there is also minimal ballooning around the edges of the pad. The heel pad is able to rebound significantly but also undergoes less compression. In general, the gas within the composite foam product of the present invention travel relatively slowing from cell to cell in the foam core when receiving a compressive force.

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A process for forming a composite foam product comprising:

forming a foam core from a foamable material and a blowing agent, said foam core having a plurality of cells therein, said plurality of cells retaining a gas from said blowing agent therein at a pressure above an ambient pressure, and said foam core having an exterior surface; and then placing a first gas impermeable film in a molding cavity;

placing said foam core in said molding cavity;

placing a second gas impermeable film over said foam core in said molding cavity;

adhering the first and second gas impermeable films to said exterior surface of said foam core by heating the first and second gas impermeable films to their softening temperatures, wherein the first and second gas impermeable films are adhered to substantially all of the exterior surface of the foam core such that said gas from said blowing agent is retained in said cells of said foam core at said pressure above said ambient pressure;

wherein the process further comprises applying a first adhesive between said foam core and said first gas impermeable film and applying a second adhesive between said foam core and said second gas impermeable film.

2. The process of claim 1 wherein said foamable material is selected from the group consisting of polyethylene resins, polypropylene resins, thermoplastic resins, or mixtures thereof.

3. The process of claim 1 wherein said foamable material is selected from the group consisting of high density polyethylene, low density polyethylene, linear low density polyethylene, ethylene-vinyl acetate copolymer, ethylene-methacrylic acid copolymer, ethylene-acrylic ester-maleic anhydride terpolymer, ethylene-glycidyl methacrylate copolymer, ethylene-glycidyl methacrylate-methacrylateterpolymer, ethylene-glycidyl methacrylate-vinyl acetate terpolymer, ethylene-alpha-olefin copolymer, modified polyolefin, and chlorinated polyethylene.

4. The process of claim 1 wherein said foamable material is selected from the group consisting of propylene homopolymer, propylene-ethylene random copolymer, propylene-ethylene block copolymer, propylene-butene random copolymer, and propylene-ethylene-butene terpolymer.

5. The process of claim 1 wherein said foamable material is selected from the group consisting of polyvinyl chloride, polyvinyl chloride-vinyl acetate copolymer, chlorinated polyvinyl chloride, polyvinyl chloride-ethylene-vinyl acetate copolymer, polyvinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, and PVC-nitrile rubber.

6. The process of claim 1 wherein said blowing agent is selected from the group consisting of N-nitroso compounds, sulfonyl hydrazines, sulfonyl semicarbazides, ammonium, and azo type compounds.

7. The process of claim 1 wherein said gas from said blowing agent is substantially an inert gas.

8. The process of claim 1 wherein each of said first and second gas impermeable films is selected from the group consisting of one or more polyolefins, polyurethanes, polyvinyls, polyethers, and polyesters.

9. The process of claim 1 wherein each of said first and second gas impermeable films is selected from the group consisting of polyethylene/vinyl alcohol copolymers, poly (vinylidine chloride) copolymer, polyethylene terephthalate, polyamides, nylon, and thermoplastic polyurethane.

10. The process of claim 1 wherein said step of forming said foam core comprises the step of:

applying an alternating radio frequency dielectric field to heat said foamable material and said blowing agent.

11. The process of claim 10 wherein said alternating radio frequency dielectric field is generated between a first top electrode and a second bottom electrode.

12. The process of claim 11 wherein said first top electrode is a high voltage electrode having a voltage between 1000 and 10,000 V.

13. A process for forming a composite foam product comprising:

providing a flow molding apparatus having an upper mold and a bottom mold that define a molding cavity therebetween and also having a movable diaphragm disposed in said molding cavity;

positioning a first gas impermeable film on said bottom mold in said molding cavity;

placing a foaming mixture comprising a foamable material and a blowing agent on said gas impermeable film in said molding cavity;

placing a second gas impermeable film over said foaming mixture in said molding cavity; and deflecting said moveable diaphragm downwards so as to expel air from said molding cavity;

heating said foaming mixture and said first and second gas-impermeable films in said molding cavity, whereby said moveable diaphragm is deflected upwards as said foaming mixture expands to form a foam core having an exterior surface and a plurality of cells therein, said plurality of cells having a gas from said blowing agent therein at a pressure above an ambient pressure; and whereby said first and second gas-impermeable films are adhered to said exterior surface of said foam core.

14. The process of claim 13 wherein said foamable material is selected from the group consisting of polyethylene resins, polypropylene resins, thermoplastic resins, or mixtures thereof.

15. The process of claim 13 wherein said foamable material is selected from the group consisting of high density polyethylene, low density polyethylene, linear low density polyethylene, ethylene-vinyl acetate copolymer, ethylene-methacrylic acid copolymer, ethylene-acrylic ester-maleic anhydride terpolymer, ethylene-glycidyl methacrylate copolymer, ethylene-glycidyl methacrylate-methacrylateterpolymer, ethylene-glycidyl methacrylate-vinyl acetate terpolymer, ethylene-alpha-olefin copolymer, modified polyolefin, and chlorinated polyethylene.

16. The process of claim 13 wherein said foamable material is selected from the group consisting of propylene homopolymer, propylene-ethylene random copolymer, propylene-ethylene block copolymer, propylene-butene random copolymer, and propylene-ethylene-butene terpolymer.

17. The process of claim 13 wherein said foamable material is selected from the group consisting of polyvinyl chloride, polyvinyl chloride-vinyl acetate copolymer, chlorinated polyvinyl chloride, polyvinyl chloride-ethylene-vinyl acetate copolymer, polyvinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, and PVC-nitrile rubber.

18. The process of claim 13 wherein said blowing agent is selected from the group consisting of N-nitroso compounds, sulfonyl hydrazines, sulfonyl semicarbazides, ammonium, and azo type compounds.

19. The process of claim 13 wherein said gas from said blowing agent is substantially an inert gas.

20. The process of claim 13 wherein each of said first and second gas impermeable films is selected from the group consisting of one or more polyolefins, polyurethanes, polyvinyls, polyethers, and polyesters.

21. The process of claim 13 wherein each of said first and second gas impermeable films is selected from the group consisting of polyethylene/vinyl alcohol copolymers, poly (vinylidine chloride) copolymer, polyethylene terephthalate, polyamides, nylon, and thermoplastic polyurethane.

22. The process of claim 13 further comprising the step of applying an adhesive film between said foam core and each of said first and second gas impermeable films.

23. The process of claim 13 wherein said heating occurs by applying an alternating radio frequency dielectric field across said molding cavity.

24. The process of claim 23 wherein said alternating radio frequency dielectric field has a frequency between about 1 MHz to 100 MHz, and a voltage of between about 1000 V to 10,000 V.

25. A process for forming a composite foam product comprising:
  providing a flow molding apparatus having a first mold and a second mold that define a molding cavity and also having a movable diaphragm disposed in said molding cavity;
  positioning a gas impermeable film in said molding cavity;
  placing a foaming mixture comprising a foamable material and a blowing agent in said molding cavity;
  deflecting said moveable diaphragm downwards so as to expel air from said molding cavity;
  heating said foaming mixture and said gas impermeable film in said molding cavity, whereby said moveable diaphragm is deflected upwards as said foaming mixture expands to form a foam core having an exterior surface and a plurality of cells therein, said plurality of cells having a gas from said blowing agent therein at a pressure above an ambient pressure; and
  whereby said gas impermeable film is adhered to said foam core.

26. The process of claim 25 wherein said foamable material is selected from the group consisting of polyethylene resins, polypropylene resins, thermoplastic resins, or mixtures thereof.

27. The process of claim 25 wherein said foamable material is selected from the group consisting of high density polyethylene, low density polyethylene, linear low density polyethylene, ethylene-vinyl acetate copolymer, ethylene-methacrylic acid copolymer, ethylene-acrylic ester-maleic anhydride terpolymer, ethylene-glycidyl methacrylate copolymer, ethylene-glycidyl methacrylate-methacrylateterpolymer, ethylene-glycidyl methacrylate-vinyl acetate terpolymer, ethylene-alpha-olefin copolymer, modified polyolefin, and chlorinated polyethylene.

28. The process of claim 25 wherein said foamable material is selected from the group consisting of propylene homopolymer, propylene-ethylene random copolymer, propylene-ethylene block copolymer, propylene-butene random copolymer, and propylene-ethylene-butene terpolymer.

29. The process of claim 25 wherein said foamable material is selected from the group consisting of polyvinyl chloride, polyvinyl chloride-vinyl acetate copolymer, chlorinated polyvinyl chloride, polyvinyl chloride-ethylene-vinyl acetate copolymer, polyvinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, and PVC-nitrile rubber.

30. The process of claim 25 wherein said blowing agent is selected from the group consisting of N-nitroso compounds, sulfonyl hydrazines, sulfonyl semicarbazides, ammonium, and azo type compounds.

31. The process of claim 25 wherein said gas from said blowing agent is substantially an inert gas.

32. The process of claim 25 wherein said gas impermeable film is selected from the group consisting of one or more polyolefins, polyurethanes, polyvinyls, polyethers, and polyesters.

33. The process of claim 25 wherein said gas impermeable film is selected from the group consisting of polyethylene/ vinyl alcohol copolymers, poly(vinylidine chloride) copolymer, polyethylene terephthalate, polyamides, nylon, and thermoplastic polyurethane.

34. The process of claim 25 further comprising the step of applying an adhesive film between said foam core and said gas impermeable film.

35. The process of claim 25 wherein said heating occurs by applying an alternating radio frequency electric field across said molding cavity.

36. The process of claim 35 wherein said heating occurs by applying an alternating radio frequency dielectric field having a frequency between about 1 MHz to 100 MHz and a voltage between about 1000 V to 10,000 V.

* * * * *